Patented Apr. 27, 1937

2,078,653

UNITED STATES PATENT OFFICE 2,078,653

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application June 6, 1936, Serial No. 83,959

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state thoroughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly stated, our process consists in subjecting a petroleum emulsion to the action of a treating agent comprising an amide or substituted amide, in which the acyl group is derived from a detergent-forming monocarboxy acid such as a fatty acid, abietic acid, naphthenic acid, etc.

It is well known that fatty acids such as oleic acid, stearic acid, palmitic acid, linoleic acid, ricinoleic acid, hydroxystearic acid, dihydroxystearic acid, etc., combine with alkalies, such as caustic soda or caustic potash, to form soaps or detergents. It is also known that rosin acids such as abietic acid, combine with alkalies to produce detergent materials. Similarly, naphthenic acids derived from petroleum are somewhat similar carboxy acids and are also known to combine with alkalies to produce soap-like materials or detergents. The expression "detergent-forming carboxy acids" refers to the type of material above indicated.

Naturally, modifications of fatty acids which do not alter their soap-forming or detergent-forming characteristics, are just as satisfactory for the production of suitable amides as the fatty acids themselves. For example, chloroleic acid is just as suitable as oleic acid. Acetylated ricinoleic acid in which the hydroxyl group has been replaced by the acetyl radical and which might be considered as acetyl oleic acid, is just as satisfactory as oleic acid. It is not intended to include such modifications as would change the acid from a monobasic acid to a dibasic acid. This limitation eliminates phthalic acid derivatives, sulfo-acid derivatives, etc.

Amides may be limited to compounds in which one hydrogen atom of ammonia, or of a corresponding primary or secondary amine, has been replaced by an acyl radical obtained from a carboxy acid. The method of preparing such compounds is well known (see Organic Chemistry, Lucas, 1935, pp. 294 and 295). Amides derived from various fatty acids, such as stearamide, oleoamide, ricinoleo-amide, etc., are available commercially in the open market. Other corresponding amides derived from other fatty acids or from naphthenic acids or rosin acids, can be prepared in the same manner as is employed to prepare the commercially available fatty acid amides.

Mono-substituted or di-substituted amides obtained by reaction with aniline, benzylamine, butylamine, amylamine, hexylamine, diamylamine, cyclohexylamine, toluidine, methylaniline, diphenylamine, etc., may be prepared in the same manner as is employed in the manufacture of the fatty acid amides. The word "amide", as used in the claims, is intended to include the substituted as well as the unsubstituted type.

The detergent-forming carboxy acid amides and substituted amides have been employed as a raw material for the manufacture of various demulsifying agents, provided that the acyl radical was susceptible to modification such as the introduction of a sulfate radical or a sulfonic acid residue, or the introduction of a residue derived from a dicarboxy acid such as phthalic acid, maleic acid, oxalic acid, etc. This last mentioned class of materials is contemplated for use in breaking oil field emulsions in a process described in a copending application for patent of Melvin De Groote and Bernhard Keiser, S. N. 83,958, filed June 6, 1936.

We have found that in a number of instances, amides of the kind described are effective demulsifying agents and compare favorably in treating action with modifications or derivatives obtained by reactions between such amides and sulfuric acid, phthalic acid, oxalic acid, etc. We have found that many petroleum emulsions and rather a large number from oil fields located in what is known as the East Texas District, in the territory at and near Kilgore and Gladewater, East Texas, are readily susceptible to demulsification with unmodified amides derived from detergent-forming carboxy acids. This is especially true when the detergent-forming carboxy acid is a fatty acid, and more particularly when the fatty acid is of the hydroxylated or oxy type, as obtained in certain oxidation processes.

The reason for the effectiveness of these unmodified amides is not understood, although various explanations may be offered. One explanation is that in the same manner that oleic acid, an oil soluble material, will emulsify benzene-in-water, these amides have a comparable, latent ability to emulsify oil in water, and therefore their presence in a demulsifying agent contributes an added effectiveness based on the theory of antagonistic demulsifiers. Another suggestion is that these materials, still containing the carbonyl group and a nitrogen group, are markedly polar, even though their polar effect, that is, the ability to spread on or dissolve in water, is not always apparent under ordinary conditions. Another thought is that these materials possess the power of hydrating and that the effectiveness is due to the hydrated form. For instance, ricinoleo-amide is relatively water insoluble and produces no marked frothing effect in water. On the other hand, a solution in alcohol when mixed with water under the proper conditions, will give a rather finely divided colloidal sol which shows both frothing property and emulsifying action. What has been said previously is submitted not in an effort to suggest the true explanation of why these amides are effective, but to point out the reason why possibly they have not been heretofore employed in an unmodified or unchanged form.

As previously stated, we prefer to use the amides derived from fatty acids rather than those derived from naphthenic acids or rosin acids. We have found that the amides derived from oxy or hydroxy fatty acids, such as ricinoleic acid, diricinoleic acid, polyricinoleic acid, hydroxystearic acid, dihydroxystearic acid, etc., are the most desirable reagents. One suitable type of our preferred reagent is the amide of polyricinoleic acid of the kind described in German Patent 552,251, to Deutsche Hydrierwerke, A. G., Rodleben, issued on June 10, 1932. This material will hereafter be referred to as polyricinoleo-amide. Ricinoleo-amide is also a satisfactory reagent.

U. S. Patent 2,034,941, to De Groote, Keiser, and Wirtel, dated March 24, 1936, describes a demulsifying agent obtained by oxidation of ricinoleic acid. We have found that if such oxidized ricinoleic acid is converted into an amide, the reagent so obtained is an especially effective demulsifying agent, and it is the one which we prefer to employ in practising our process. The production of such oxidized ricinoleic acid is described in detail on page 3 of said De Groote et al. patent.

We have found it most satisfactory to convert such oxyricinoleic acid obtained according to the procedure described in said aforementioned De Groote et al. patent, into the ethyl ester by reaction with ethyl alcohol, in presence of dry hydrochloric acid gas. We have found that the ammonolysis of such an ester yields the oxy ricinoleo-amide with considerable ease. This particular material will be herein referred to as oxy-ricinoleo-amide.

Other similar hydroxy or oxy fatty acid amides may be obtained by converting various other hydroxy or oxy fatty acids into unsubstituted or substituted amides in a similar manner. For instance, cottonseed oil fatty acids, corn oil fatty acids, rape-seed oil fatty acids, and the like, can be oxidized by conventional processes to yield fatty acids which can then be esterified with ethyl alcohol or the like, and can then be converted into amides by reaction with ammonia.

The amides employed in the present process are simple unmodified amides and are free from resinoid properties. Certain demulsifying agents having resinoid properties have been described for use in breaking oil field emulsions. Such resinoid materials are characterized by the fact that upon heating the same, they produce a synthetic resin, unless such resinification is prevented or modified by the presence of a protective colloid or a solvent, or a modifying group, such as a fatty acid group or a sulfo group. The simple unmodified fatty amides of the kind employed in the present process are entirely devoid of resinoid properties. They can be heated just below their point of decomposition for an indefinite period without changing their physical structure. They do not have present any solvent which retards resinification. They do not have present a hydrophile radical, such as a sulfo radical, which prevents resinification. They do not have present any protective colloid which retards resinification. They are devoid of typical resinophore radicals, such as aldehydic radicals, phenolic radicals, etc. The fatty acyl group present cannot be considered as a modifying group preventing resinification, because if the fatty acyl group is eliminated, one has present only an amine residue or an ammonium residue which obviously is not resinoid or resin-forming in character, in absence of some other group or radical. Naturally the simple amides have no other group or radical present after the elimination of the fatty acyl group. For sake of clarity, the expression "non-sulfo, non-resinoid" is used in the claims to indicate the absence of the characteristic properties of a synthetic resin or modified synthetic resin, and also to indicate the absence of any sulfo radical.

Another suitable procedure is to oxidize various unsaturated oils and convert the glycerides or esters into fatty acids by means of any suitable hydrolytic process, such as the well-known Twitchell process. These acids can be converted into the ethyl esters, which can be subjected to ammonolysis.

The blowing (oxidation) of various oils is a well-known commercial process and consists in selecting a suitable relatively highly unsaturated oil or acid, or a mixture of the same, and blowing said fatty material with dry or moist air, or with any other suitable oxidizing agent. This results in the production of a hydroxylated or oxy fatty material, which may or may not also be unsaturated.

Other suitable hydroxy or oxy fatty acids which may be converted into amides or into substituted amides, after intermediate esterification, include oxy-hendecenoic acid, described in U. S. Patent 2,023,996, dated December 10, 1935, to De Groote and Keiser; oxy-octadecadiene acid, described in U. S. Patent 2,023,997, dated December 10, 1935, to De Groote and Keiser; oxy-polyketo fatty acids, described in U. S. Patent 2,025,804, dated December 31, 1935, to De Groote and Keiser; oxy-keto fatty acids, such as keto hydroxy stearic acid, described in U. S. Patent 2,025,805, dated December 31, 1935, to De Groote and Keiser.

The expression "hydroxy fatty acid" is intended to include the ether anhydride derivative of dihydroxy acids or the like as well, insofar that such particular oxy acids act substantially the same as if they were dihydroxy acids. For instance, a dihydroxy acid in which the hydroxy groups unite to eliminate water with the formation of an oxide of the ether type, are frequently also referred to as oxy acids, and are intended to be included within the expression "hydroxy fatty acids" or "oxy fatty acid" in the same manner that one might include phthalic anhydride within the classification of aromatic dicarboxy acids, insofar that it acts in a similar manner.

We desire to point out that the superiority of the reagent used as the demulsifying agent in our process, is based upon its ability to treat certain emulsions more advantageously and at a somewhat lower cost than is possible with other demulsifiers, or conventional mixtures thereof. It is believed that the particular demulsifying agent or treating agent herein described will find comparatively limited application so far as the majority of oil field emulsions are concerned; but we have found that such a demulsifying agent has commercial value, as it will economically break or resolve certain oil field emulsions in a number of cases which cannot be treated as easily or at so low a cost with the demulsifying agents heretofore available.

In practising our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide extract, obtained in the refining of petroleum, etc. may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water-solubility and relatively limited oil-solubility. However, since such reagents are sometimes used in a ratio of 1 to 10,000 or 1 to 20,000 or 1 to 30,000, such an apparent insolubility in oil and water is not significant, because said reagents undoubtedly have solubility within the concentration employed. This same fact is true in regard to the material or materials employed as the demulsifying agent of our process.

Having thus described our invention, what we claim as new and desire to secure by Letters Patent is:

1. A process for breaking petroleum emulsions of the water-in-oil type, which consists in subjecting the emulsion to the action of a demulsifying agent comprising a non-sulfo, non-resinoid amide in which the acyl group is derived from a detergent-forming monocarboxy acid.

2. A process for breaking petroleum emulsions of the water-in-oil type, which consists in subjecting the emulsion to the action of a demulsifying agent comprising a non-sulfo, non-resinoid amide in which the acyl group is derived from a fatty acid.

3. A process for breaking petroleum emulsions of the water-in-oil type, which consists in subjecting the emulsion to the action of a demulsifying agent comprising a non-sulfo, non-resinoid amide in which the acyl group is derived from a hydroxylated fatty acid.

4. A process for breaking petroleum emulsions of the water-in-oil type, which consists in subjecting the emulsion to the action of a demulsifying agent comprising a non-sulfo, non-resinoid unsubstituted amide in which the acyl group is derived from a hydroxylated fatty acid.

5. A process for breaking petroleum emulsions of the water-in-oil type, which consists in subjecting the emulsion to the action of a demulsifying agent comprising ricinoleo-amide.

6. A process for breaking petroleum emulsions of the water-in-oil type, which consists in subjecting the emulsion to the action of a demulsifying agent comprising poly-ricinoleo-amide.

7. A process for breaking petroleum emulsions of the water-in-oil type, which consists in subjecting the emulsion to the action of a demulsifying agent comprising oxy-ricinoleo-amide.

MELVIN DE GROOTE.
BERNHARD KEISER.